US012646083B2

(12) United States Patent
Yang et al.

(10) Patent No.: US 12,646,083 B2
(45) Date of Patent: Jun. 2, 2026

(54) ANALYSIS AND PREDICTION FROM VENUE DATA

(71) Applicant: Foursquare Labs, Inc., New York, NY (US)

(72) Inventors: Stephanie Yang, New York, NY (US); Blake Shaw, New York, NY (US)

(73) Assignee: Foursquare Labs, Inc., New York, NY (US)

( * ) Notice: Subject to any disclaimer, the term of this patent is extended or adjusted under 35 U.S.C. 154(b) by 33 days.

(21) Appl. No.: 14/926,852

(22) Filed: Oct. 29, 2015

(65) Prior Publication Data

US 2017/0124465 A1     May 4, 2017

(51) Int. Cl.
*G06Q 30/02*      (2023.01)
*G06N 20/00*      (2019.01)
*G06Q 10/109*     (2023.01)

(52) U.S. Cl.
CPC ............. *G06Q 30/02* (2013.01); *G06N 20/00* (2019.01); *G06Q 10/109* (2013.01)

(58) Field of Classification Search
CPC .... G06Q 30/02; G06Q 10/309; G06Q 10/109; G06N 20/00
See application file for complete search history.

(56) References Cited

U.S. PATENT DOCUMENTS 8,751,427 B1 *   6/2014   Mysen .................. H04L 67/306
                                                                706/46
8,768,867 B1 *   7/2014   Thaeler .................. G06Q 30/02
                                                                706/12
9,262,481 B1 *   2/2016   Le .......................... G06Q 50/01
2013/0325855 A1 *  12/2013  Kapicioglu ....... G06F 17/30241
                                                                707/724
2015/0112919 A1 *   4/2015   Weir ................ G06Q 10/08355
                                                                706/52
2016/0034462 A1 *   2/2016   Brewer ............. G06F 17/30958
                                                                707/734

OTHER PUBLICATIONS

Vasconcelos, Marisa et al. "Popularity Dynamics of Foursquare Micro-Reviews", Published Oct. 1, 2014 [online], [retrieved May 10, 2018] <URL: http://cosn.acm.org/2014/files/cosn089f-vasconcelosA.pdf>.*

(Continued)

*Primary Examiner* — David Yi
*Assistant Examiner* — Amy Tran

(57)                ABSTRACT

Non-limiting examples of the present disclosure describe analysis of venue data and prediction of trendiness of venues based on analyzing the venue data. As an example, one or more new venues are determined. The one or more new venues are determined by identification of a venue that has venue data existing for a period of time less than or equal to a predetermined time threshold. The venue data associated with the one or more new venues is evaluated. A predicted popularity for the one or more new venues is generated based on evaluation of the venue data. The generated predicted popularity may be provided to a processing device. In some examples, a ranked list of the one or more new venues is generated. The ranked list may display the one or more venues in a ranked order according to the generated predicted popularity. Other examples are also described.

19 Claims, 5 Drawing Sheets

(56)            References Cited

OTHER PUBLICATIONS

Kapicioglu, Berk "Applications of Machine Learning to Location Data". Princeton University Doctoral Thesis [Published 2013] [Retrieved May 2020] <URL: https://www.berkkapicioglu.com/wp-content/uploads/2013/11/thesis_final.pdf> (Year: 2013).*

Preotiuc-Pietro, Daniel et al. "Exploring venue-based city-to-city similarity measures." UrbComp '13 [Published 2013] [Retrieved May 2020] <URL: https://dl.acm.org/doi/abs/10.1145/2505821.2505832> (Year: 2013).*

Wikipedia "Transformation (function)" Wikipedia [Cached version published 2014] [Retrieved Sep. 2020] <URL:https://en.wikipedia.org/w/index.php?title=Transformation_(function)&oldid=623432019> (Year: 2014).*

Fei Cai, et al. "Time-sensitive Personalized Query Auto-Completion." CIKM '14 Association for Computing Machinery, New York, NY, USA, 1599-1608. https://doi.org/10.1145/2661829.2661921 (Year: 2014).*

A. Noulas et al. "A Random Walk around the City: New Venue Recommendation in Location-Based Social Networks," 2012 International Conference on Privacy, Security, Risk and Trust, Amsterdam, Netherlands, 2012, pp. 144-153, doi: 10.1109/SocialCom-PASSAT.2012.70. (Year: 2012).*

Karamshuk, Dmytro, et al. "Geo-spotting: mining online location-based services for optimal retail store placement." Proceedings of the 19th ACM SIGKDD international conference on Knowledge discovery and data mining. 2013. (Year: 2013).*

Georgiev, Petko, Anastasios Noulas, and Cecilia Mascolo. "The call of the crowd: Event participation in location-based social services." Proceedings of the International AAAI Conference on Web and Social Media. vol. 8. No. 1. 2014. (Year: 2014).*

Authors: Sklar et al. Title: Recommending Interesting Events in Real-time with Foursquare Check-ins Published: Sep. 9, 2012 (Year: 2012).*

Sklar et al. (2012) Sixth ACM Conference on Recommender Systems, Sep. 9-13, Dublin, Ireland "Recommending Interesting Events in Real-time with Foursquare Check-ins" 2 pages.

* cited by examiner

HOT THIS WEEK

Location:
New York City  Change

| | |
|---|---|
| 1 | BLAKE'S BURGER JOINT  (Hotness Score: 97%) |
| 2 | HOT CROSS BUNS  (Hotness Score: 96%) |
| 3 | ANDY'S CANDIES  (Hotness Score: 93%) |
| 4 | STEPHANIE'S SUBS  (Hotness Score: 92%) |
| 5 | CHASE LOUNGE  (Hotness Score: 90%) |

Figure 3A:
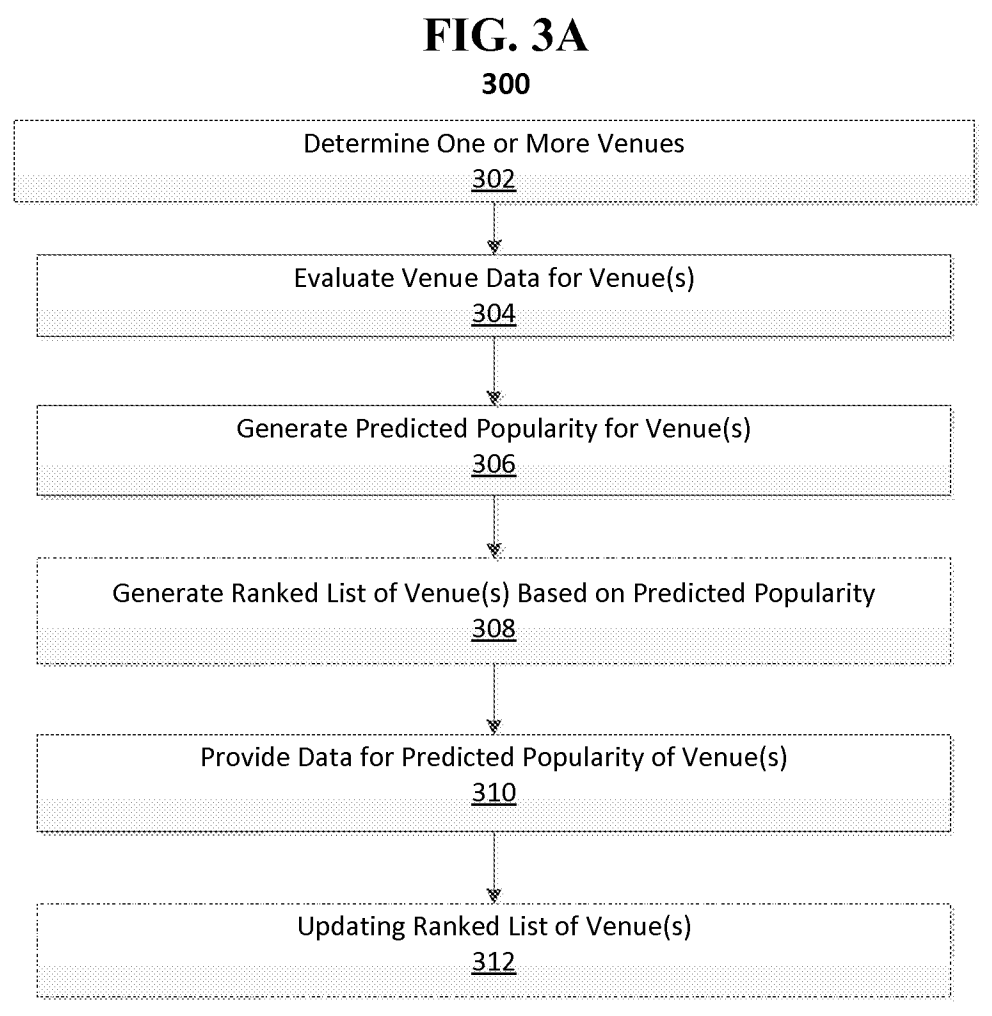

Determine One or More Venues
302

Evaluate Venue Data for Venue(s)
304

Generate Predicted Popularity for Venue(s)
306

Generate Ranked List of Venue(s) Based on Predicted Popularity
308

Provide Data for Predicted Popularity of Venue(s)
310

Updating Ranked List of Venue(s)
312

320

Collect Venue Data for Plurality of Venues
322

Evaluate Venue Data for Plurality of Venues
324

Generate Ranked List of Plurality of Venues
326

Provide/Display Ranked list of Plurality of Venues
328

Update Ranked List of Plurality of Venues
330

Provide/Display Updated Ranked List
332

ANALYSIS AND PREDICTION FROM VENUE DATA

BACKGROUND

Statistical analysis of data is typically perfected using human curation. Human curation is typically used to identify trendiness with respect to new people, places, things, etc. However, human curation can be biased and non-comprehensive. It is with respect to this general environment that aspects of the present technology disclosed herein have been contemplated.

SUMMARY

Non-limiting examples of the present disclosure describe analysis of venue data and prediction of trendiness of venues based on analyzing the venue data. As an example, one or more new venues are determined. The one or more new venues may be determined by identification of a venue that has venue data existing for a period of time less than or equal to a predetermined time threshold. The venue data associated with the one or more new venues may be evaluated. A predicted popularity for the one or more new venues may be generated based on evaluation of the venue data. The generated predicted popularity may be provided to a processing device. In some examples, a ranked list of the one or more new venues is generated. The ranked list may display the one or more venues in a ranked order according to the generated predicted popularity.

In another non-limiting example, venue data for a plurality of new venues is collected. The plurality of new venues are venues that have venue data existing for a period of time less than or equal to a predetermined time threshold value. The venue data is evaluated, wherein the evaluating the venue data may comprise applying processing operations to determine a total recent popularity for a venue of the plurality of new venues using the venue data. The evaluation may further comprise applying processing operations to determine a change in recent popularity for a venue of the plurality of new venues using the venue data. A ranked list for the plurality of new venues may be generated based on a predicted popularity determination for each of the plurality of new venues. In the ranked list, the plurality of new venues may be ranked according to the predicted popularity determination for each venue determined based on the applied processing operations that evaluate the total recent popularity and the change in recent popularity for each of the plurality of new venues using a weighted model. In some examples, the ranked list is displayed on a processing device or provided to one or more other processing devices. In examples, the ranked list may be updated and provided to one or more processing devices.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures. As a note, the same number represents the same element or same type of element in all drawings.

FIG. 2 illustrates an exemplary processing device view of a compiled ranked list of venue data as described herein.

FIG. 3A illustrates an exemplary method for providing data for predicted popularity of venues as described herein.

DETAILED DESCRIPTION

Figure 1:
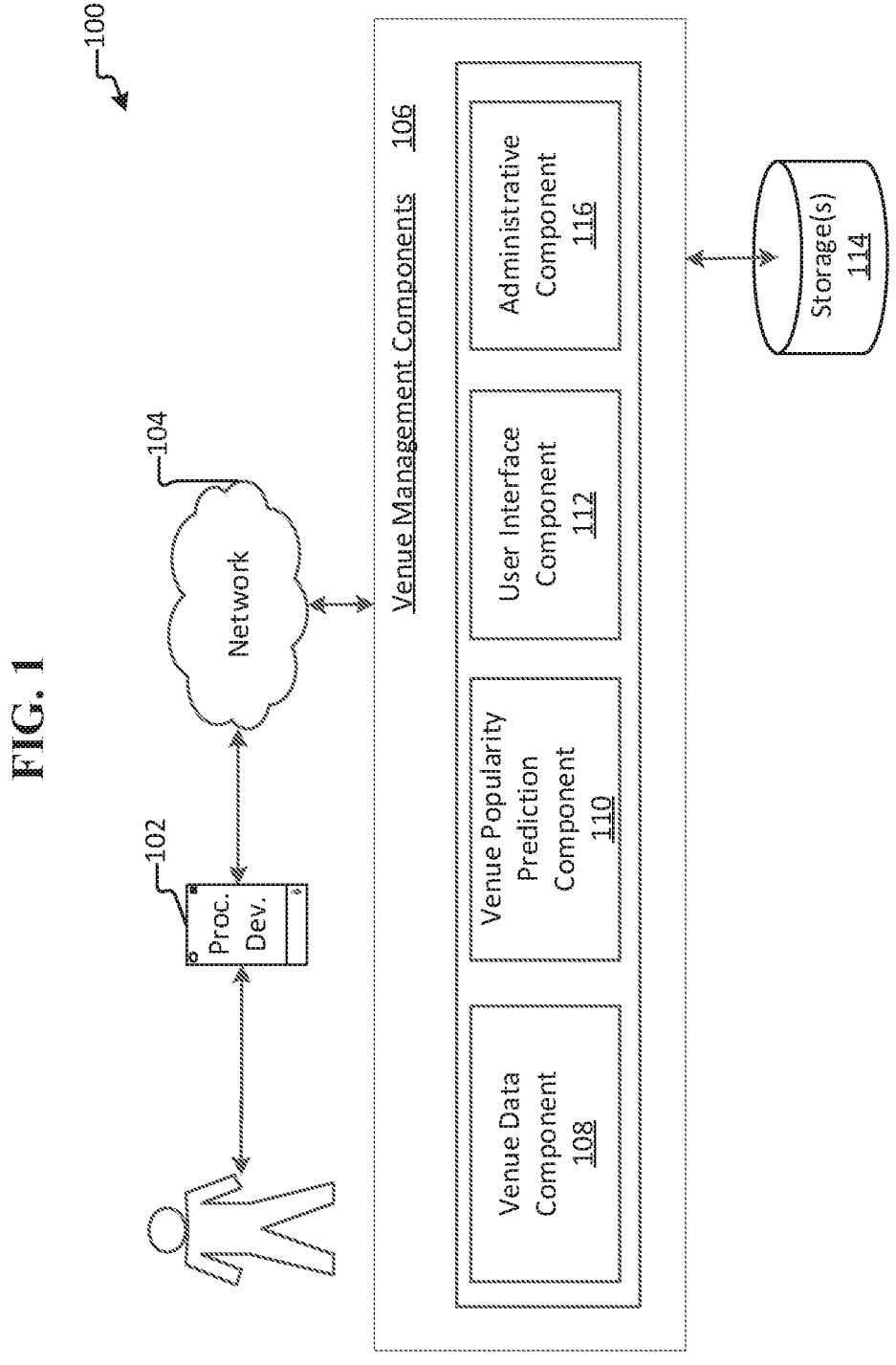
FIG. 1 illustrates an exemplary system for venue data processing as described herein.

There are a number of ways users can interact with applications/mobile applications. As an example, consider a search and discovery application service that is associated with entities such as venues. In examples, a venue is a defined area for organization of people/events. A venue may comprise one or more venues, for example a building may have a plurality of units that can each be considered venues. Examples of venues include but are not limited to: places of business (e.g., stores, restaurants, and offices), homes, buildings/portions of buildings such as suites and apartments, museums, schools, theatres, event halls, airports, transportation/vehicles, stadiums, and geographic regions (e.g., fair grounds, music festivals), among other examples. A venue may comprise venue data. Venue data is any data that is able to be associated with an entity such as a venue. Examples of venue data comprise but are not limited to: identifiers (name, wireless access point data, nicknames, address, phone, email etc.), description including details about the venue (e.g., lists, menus, brochures, marketing material, etc.), images, reviews, tips, recommendations, location information, people/users, statistical analysis data, timestamp data, and any other signal data that may be passively or explicitly collected, among other examples. Signal data may be any data that is collected over a network, a computer channel or wirelessly, among other examples. A user of an exemplary application may interact with any type of venue data, for instance, by venue check-in actions, explicitly liking/disliking a venue, saving venue data to a user profile of the application, writing a tip or recommendation about the venue, and sharing information such as images, videos, audio, posts, etc. about the venue, among other examples. Both passive and explicit actions may be recorded and data may be processed to improve a user experience with the exemplary application/service. As a note, data collection, including data that is passively or explicitly collected, may be performed in a manner that complies with privacy laws and user consent and/or preferences.

In cases where enough venue data is generated or gathered for a particular venue (e.g., through user interaction and/or obtainable information over distributed networks such as the Internet), collected signal data corresponding with venue data can be analyzed and compared with venue data for other venues. In this way, a user interaction with an exemplary search and discovery application service can be improved, for example, by capturing trending patterns and comparing the trendiness of venues against one another. Trendiness is a social categorization of something (e.g., venue, person, thing, etc.) that may be predicted through processing operations for analyzing collected data. Through applied processing operations, result data can be generated and provided to users of an exemplary application/service. As an example, analyzed venue data can be presented/displayed to a user of the exemplary application/service. For instance, analyzed venue data may be presented to the user as directed information. Directed information may be information that is targeted to one or more specific devices (or users associated with such specific devices) based upon an action performed by the device (e.g., a check-in, submitting a tip, etc.), passive information collected from the device (e.g., location information, time data, etc.), based upon profile information for an account associated with a device, and based on analyzed data such as venue data, among other examples.

In one example, the specific devices may receive different directed information based on geographic locations. Directed information may be provided in response to an action (e.g., a check-in), a query, a situation (e.g., identification that the device is at a specific location), or based upon any other type of trigger or event. Directed information may be content (e.g., text, audio, and/or video content), metadata, instructions to perform an action, tactile feedback, or any other form of information capable of being transmitted and/or displayed by a device. Directed information may also be personalized information. The personalization of directed information may be based upon a history associated with a device, a profile associated with the device, based upon the capabilities of a device, etc. Among other benefits, the aspects disclosed herein may be employed to generate directed information for a target device. Entity data may be one or more uniquely identifiable elements, such as the name of a person, place, thing, word, phrase, symbol, image, sound, etc. For instance, a ranked list of trendy new venues in New York City may be presented to devices/users that are located in New York City. However, one skilled in the art should recognize that generated directed information may be available to any and all users of an exemplary application/ service regardless of geographic location. For instance, a user may be located in San Diego but wish to receive directed information about trending venues in New York City or Paris, France. Furthermore, directed information may be either static for a predetermined period of time or dynamically updated based on continuous analysis of venue data. For instance, a list of trending venues may be presented for a predetermined time period (e.g., week, month, year, etc.). In some examples, that list may be updated based on changes/trends in data that is determined from the processing of collected venue data. In this way, an exemplary application/service can keep users up to date with trending information about venues. As identified above, a venue may be classified as a type of entity data. As such, examples described herein are applicable to other types of entity data. Other examples of directed information may be a recommendation or tip. For example, recommendations and/or tips may be used to personalize a user experience such as receiving a recommendation about a new restaurant that the user may be interested in. In another example, a tip may be generated or forwarded to a user about a particular venue. For instance, a user (who enjoys veggie burgers) may receive a tip to try the deluxe veggie burger at a new restaurant in a location near the user. In any example described herein, trending directed information from around the world can be generated without having to rely on human curation which can be biased and non-comprehensive.

As such, a number of technical advantages are achieved based on the present disclosure including but not limited to: generation of trending directed information, organization and management of a large corpus of venue data, continuous identification of new venues, improved interaction with users of an exemplary application/service, improved accuracy in trending venue prediction, enhanced reliability in venue check-ins including reduction in incorrect venue predictions, improved processing efficiency as compared with other methods such as human curation and improved usability related to venue check-in applications and services, among other examples.

FIG. 1 illustrates an exemplary system for venue data processing as described herein. Exemplary system 100 presented is a combination of interdependent components that interact to form an integrated whole for learned program generation based on user example operations. Components of system 100 may be hardware components or software implemented on and/or executed by hardware components of system 100. In examples, system 100 may include any of hardware components (e.g., ASIC, other devices used to execute/run an operating system (OS)), and software components (e.g., applications, application programming interfaces, modules, virtual machines, runtime libraries, etc.) running on hardware. In one example, an exemplary system 100 may provide an environment for software components to run, obey constraints set for operating, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. As an example of a processing device/operating environment, refer to FIG. 4 and the accompanying description. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 100 may vary and may include more or fewer components than those described in FIG. 1. In some examples, interfacing between components of the system 100 may occur remotely, for example where components of system 100 may be spread across one or more devices of a distributed network. In examples, one or more data stores/ storages or other memory are associated with system 100. For example, a component of system 100 may have one or more data storages/memories/stores associated therewith. Data associated with a component of system 100 may be stored thereon as well as processing operations/instructions executed by a component of system 100.

System 100 comprises a processing device 102, a network connection 104, venue management components 106, and storage(s) 114. The venue management components 106 may comprise one or more additional components such as a venue data component 108, popularity prediction component 110, user interface component 112 and an administrative component 116. As an example the venue management components 106 including sub-components, may be included in a server (e.g., client/server relationship). In another example, any components of system 100 may be maintained on a client device that interfaces with one or more additional processing devices that are connected over a distributed network, for example.

Processing device 102 may be any device comprising at least one processor and at least one memory/storage. Examples of processing device 102 may include but are not limited to: mobile devices (such as phones, tablets, laptops, watches, etc.), desktop computers, servers, vehicular processing devices, televisions, gaming consoles, etc. In examples, processing device 102 may communicate with venue management components 106 via a network 104. In one aspect, network 104 is a distributed computing network, such as the Internet. In some examples of system 100, the processing device 102 may be a client processing device that interfaces with one or more additional processing devices. As an example, processing device 102 may be a device of an end-user that is running an application having a user interface where operations described for the venue management components 106 (e.g., back-end operations) may be performed on one or more additional processing devices. One or more processing devices may be used to execute operations described below with respect to the venue management components 106.

In examples, information such as venue data, user profile data, etc. may be stored in storage(s) such as storage(s) 114 shown in FIG. 1. Storage 114 is any technology consisting of computer components and non-transitory recording media used to retain digital data. Examples of storage 114 comprise but are not limited to memory, memory cells, data stores, and virtual memory, among other examples. In examples, one or more storage(s) 114 may be utilized by any of the venue management components 106 to store any data usable by and/or generated by system 100. In one example, storage(s) 114 may persist one or more corpuses of structured or unstructured venue data. In examples, storage 114 may interface with the venue management components 106 to assist in further processing by other components of system 100. In examples, an exemplary application/service may maintain and organize data structures for management of venue data to effectively organize a large corpus of information and provide directed information to users of the application/service, among other examples. Storages 114 may store one or more mapping structures to organize and arrange data. A mapping structure is a collection of information/data arranged in an ordered way. Examples of mapping structures include but are not limited to: indexes, files, charts/graphs, diagrams, webpages, databases, and work-flows, lists (including generated ranked lists) among other examples. Mapping structures may be in maintained in any form and stored on a network storage 114 (or storages) of the system 100. One skilled in the art will recognize that the storage(s) 114 are robust enough to store and manage very large amounts of data, for example data related to billions of venue check-ins or user profiles. In one example, information for mapping structures of may be spread across multiple devices in a distributed network. A data mapping component may contain a plurality of mapping structures related to mapping of venue data and any other information usable to identify and predict trendiness in venues.

The venue management components 106 comprise a venue data component 108. Venue data component 108 may store a plurality of data that can be associated with a venue. The venue data component 108 may interface with any component of system 100 including processing device 102, other venue management components 106, and storage(s) 114. Examples of venue data have been provided above. Venue data may be stored for any venue (new or existing), where venue data can be analyzed to generate directed information, for example, predictions regarding trendiness of venues. For instance, an existing venue may suddenly become popular/unpopular, where an exemplary application/service can analyze venue data associated with the venue and update users of trends related to the venue. In another example, venue data can be analyzed to identify new venues. A new venue may be a venue that does not have pre-existing venue data or a venue that has venue data existing for a period of time less than or equal to a predetermined time threshold. For instance, a venue may be classified as a new venue if the venue has venue data existing for less than two-months. However, one skilled in the art should recognize that developers of an exemplary application/service can selectively set a definition for a new venue by adjusting the predetermined time threshold, among other operations.

In examples, venue data may be verified/confirmed by the application/service. For example, the venue data component 108 may perform processing operations that can curate and analyze venue data. As an example, venue data, that may be collected passively or explicitly (e.g., active data), can be further analyzed. A collection of processing operations such as rule-based programs, and/or machine-learning processing operations may be applied to evaluate (e.g., curate) venue data managed in association with the venue data component 108. For instance, consider a user of a search and discovery application service that explicitly takes action to check into a venue. Venue check-in may indicate that one or more devices are currently located at (or have visited) a particular venue. In such a case, venue data and user profile data related to the venue check-in may be analyzed to validate the check-in. In some instances, rules-based processing operations may be applied to determine whether to include the check-in data in a corpus of venue data. For instance, the venue check-in received from a client processing device may come from an un-verified user (e.g., a user that has not been confirmed by the application or service), among other examples. In such an instance, the venue data component 108 may selectively determine whether to incorporate such data into a processing operation related to determining a trendiness and/or predicted popularity of a venue.

Venue data may be collected passively, for example, where a user of an application/service does not need to take explicit action for the data to be collected and utilized. As an example, terms and conditions may be specified to the user for passive collection of data. In an example, users of an exemplary application/service may selectively configure types of data that can be passively collected by the application/service. Signal data may be passively collected by an application/service operating on a client processing device. As an example, collected passive signal data may be collected from a client processing device and transmitted to one or more additional processing device (e.g., over a distributed network). In other examples, an exemplary application/service may be configured to collect and analyze passive signal data directly via the client processing device. Examples of passively collected signal data may comprise but is not limited to: wireless scan data, passive check-in at a venue by the system/service through collected wireless signal data (e.g., corresponding with venues), inferential postings associated with a user profile that may be collected for analysis, social information such as friends/connections associated with a user profile, and spatial information associated with a processing device upon which a user profile is associated with and/or currently signed-in, and processing device information, among other examples. Wireless scan data is any signal information collected from a processing device that is usable to identify wireless connections (e.g., access points) for a processing device to connect with. Wireless scan data comprises at least one identifier of a wireless connection. Examples of identifiers of a wireless connection include, but are not limited to, media access control (MAC) addresses, timestamps, universally unique identifiers (UUIDs), service set identifiers (SSIDs), frequency information, signal strength information, accuracy information, device information, geographical information, WI-FI information, BLUETOOTH®, infrared, and/or beacon information, among other examples. Examples of processing device related information include but are not limited to: geocoding information, operating system information, application information, and device information (e.g., wireless device information), among other examples. An exemplary application/service may be configured to perform processing operations to collect passive signal data. Such processing operations include but are not limited to: application programming interfaces (APIs) or any other executable function, program, task, modules, templates, algorithms, etc. Collected passive signal data may be utilized for evaluation by the venue data component 108.

Venue data may be collected explicitly or actively, for example, where a user of an application/service takes explicit action that may trigger collection of the data by a configured exemplary application/service. As an example, terms and conditions may be specified for explicit collection of data. In an example, an exemplary application/service may selectively configure types of data that can be actively collected by the application/service. Such configurations may be based upon a profile associated with a client processing device executing the exemplary application and/or with the exemplary application itself. Signal data may be actively collected by an application/service operating on a client processing device. For instance, a processing device, operating an exemplary application/service, may be used to take action such as check-in to a venue, generate directed information, etc. In such an example, the venue data component 108 may be used to evaluate such data. In one example, the application/service may communicate with a processing device where the processing device may receive a notification prompting the processing device to present receive input (e.g., via a user interface) that indicates that a check-in to a venue should be performed. In another example, an application/service may send notification to the processing device that a particular venue has been visited when the application/service has a high level of confidence in a venue prediction. In another example, a check-in may occur via receipt of input at a processing device that acknowledges a visit to a particular venue is taking place or have previously taken place. One skilled in the art will recognize that venue identification is not limited to check-in operations at a specific venue. Signal data that may be actively collected and utilized for evaluation by the venue data component 108 from a processing device may comprise but is not limited to: check-in data, venue visit data, data associated with user tips/recommendations, review data that is associated with one or more venues, saved data (e.g., venue saved to a list of favorite venues, best venues, worst venues, etc.), likes/dislikes of venues, and/or use of other content (e.g., images, audio, video, etc.) that is associated with a venue. An exemplary application/service may be configured to perform processing operations to collect active signal data. Such processing operations include but are not limited to: application programming interfaces (APIs) or any other executable function, program, task, modules, templates, algorithms, etc.

The venue management components 106 may also comprise a venue popularity prediction component 110. The venue popularity prediction component 110 is configured to generate a predicted popularity for one or more venues associated with the managed venue data. In examples, the venue popularity prediction component 110 may perform processing operations to evaluate different aspects of venue data corresponding to a particular venue to generate a predicted popularity result for that particular venue. A predicted popularity is a prediction/estimation of trendiness or popularity of the venue based on the analysis of venue data performed by the venue popularity prediction component 110. Predicted popularity data can be utilized by an exemplary application/service in generation of directed information including generated lists of ranked venues, tips, recommendations, etc. In examples, the predicted popularity may be a result that evaluates a trendiness of a particular venue in a stand-alone manner. In other examples, the predicted popularity is a result that evaluates the trendiness of a particular venue in comparison with other venues. Processing operations employed by the venue popularity prediction component 110 for determining a predicted popularity of a venue include but are not limited to: machine-learning processing, statistical modeling, application programming interfaces (APIs) or any other executable function, program, task, modules, templates, algorithms, etc. Machine learning processes used may employ any type of statistical analysis including classification such as binary classification or multiclass classification and further include any methods suitable for learning classifiers such as Bayesian networks (e.g., Naïve Bayes), Cosine Similarity algorithms, support vector machine (SVM) processing, decision trees (e.g., random forest), support vector machines, neural networks, probit regression, and/or logistic regression, among other examples.

In some examples, a predicted popularity may be evaluated for of strictly new venues. In other examples, trendiness of existing venues may be factored into generation of directed information related to a trendiness ranking of venues. As an example, the venue popularity prediction component 110 may evaluate venue data for a particular venue using at least two types of signals: 1) a total recent popularity of the venue, and 2) a change in recent popularity for the venue. Trendiness of venues may be determined by a signal which is a linear combination of features, for example, the total recent popularity of the venue and a change in recent popularity for the venue. In evaluating the total recent popularity of the venue data, a decayed sum of aggregate counts of any recent type of activity may be collected and evaluated. Examples of recent activity that may be considered include but are not limited to: a check-in to a venue, passive data indicating a visit to a venue, a search for a venue, and/or saving information about a venue to a list in the application/service. An exemplary processing operation that utilizes the decayed sum for any activity is given may be determined by an operation similar to:

$$\text{feature} = \text{sum\_} f(d)^{\wedge}(\lambda * d)$$

where f(d) is the number of instances of the activity that happened d days ago, and $\lambda$ is a tuning parameter which controls the half-life of the decay (e.g., the current half-life is set to a predetermined period (e.g., 1 month, 14 days, 1 week, etc.)). The second type of feature for analysis is change in recent popularity for the venue. The change in recent popularity for the venue is derived from processing operations determining the best linear trend line through a recent time series of the aggregate counts of any recent type of activity. An exemplary processing operation for such a determination may be similar to:

$$\text{feature} = t\_\text{stat} = \beta / s.e.(\beta)$$

where t stat is a t-statistic of a linear analysis. $\beta$ is the least-square estimate of the slope of the trend line of the timeseries, and s.e. is the standard error. Such linear analysis comprises complementary information about the recent popularity of certain venues. The first feature captures total recent popularity, while the second feature captures changes in recent popularity. For instance, a busy airport will have high feature value for the first class of feature but a low score for the second, whereas a one-day outdoor food festival can have high feature values only for the second class of features. These features are normalized and then combined linearly:

$$ranking\_signal = \sum_{i=0}^{n} \alpha\_i \, g(feature\_i)$$

where g is a transformation which normalizes the features of each venue against the features of venues in similar categories and cities, and \alpha_i are constant coefficients. The normalization g is tuned so that the feature values for venues in the same city and category (e.g. coffee shops in New York) approximate a N(0, 1) standard distribution. Venues are then ranked according to their ranking_signal. An exemplary ranking_signal is an example of an indication of trendiness of a particular venue based on analysis performed by the venue popularity prediction component 110. Such types of feature are used to provide metrics about various user behaviors such as inferred visits, explicit check-ins, likes and dislikes, saves to a list, and tips, etc., which in aggregate provide indication of a trendiness of a particular venue.

In some examples, each feature is independently run through a geonormalization transformation which forces the distribution of each feature to be normally distributed within each city. However, the venue popularity prediction component 110 may be configured to normalize the data in any manner including those that are not restricted by location. The features are then combined together to form a final score, which are ranked to find the top most trending venues for a geographic location (e.g., zip code, city, state, country, continent, etc.). Scores may be assigned to each of the candidate venues based on application of the one or more machine-learning processes. For instance, the applied machine learning processes may assign weights (e.g., probabilities, scaling factors, etc.) based on certain types of venue data, where some types of venue data may be given greater weight than others in determining an overall predicted popularity for the venue. As an example, aspects of venue data such as positive/negatives reviews for a venue, quality of the source of the review (e.g., is the reviewer qualified/validated), types of venue check-in (e.g., passive or active), types of content associated with the venue (e.g., is the venue mentioned in a recommendation, like/dislike, tip, etc.), may be taken into account in determining a predicted popularity for the venue. Some examples of directed information may comprise a ranked list of trendy venues in a geographic region. In examples, a ranked list may be generated by category, geography, or may be more comprehensive to include a variety of statistical analysis related to one or more venues. In some examples, the ranked lists may be personalized for a demographic of one or more users. An exemplary ranked list is illustrated in FIG. 2 and described in further detail below. However, one skilled in the art should recognize that this disclosure enables for presentation/display of directed information in any form that is consistent with the present disclosure. For instance, rankings, number of venues, factors for rankings, etc. may vary to generate directed information in a plurality of forms that are also customizable and updatable.

In examples, the predicted popularity for the venue is a prediction of future popularity of the venue. For instance, whether the venue may be trendy in the next week, month, year, etc. In other examples, the venue popularity prediction component 110 may be configured to output result data that evaluates past or current popularity/trendiness related to venue data. Administrators or developers of an exemplary application/service may selectively choose generation of various directed information that can evaluate a predicted popularity for a venue for any temporal period.

The user interface component 112 is one or more components that are configured to enable interaction with a user of an application or service associated with an application or service. Transparency and organization are brought to users of such an application/service through the user interface component 112 where a user can interact with an application through user interface elements. As an example, the user interface component 112 may comprise generation and display of one or more user interface elements upon a display of a processing device. For example, in response to a user action to enter input into the device, the user interface component 112 may receive and process the request and initiate action to display a prompt for entering input into an application/service associated with a processing device upon which the application/service is executing. The user interface component 112 may further execute as a front-end for display (e.g., graphical user interface) of back-end processing performed by the other venue management components 106. In examples, user interface definition files may be used to define user interface elements for fostering interaction between a user and a system/service. User interface definition files may comprise programming instructions or operations for management and display of user interface elements associated with user interface component 112.

The administrative component 116 is one of the venue management components 106 enabling administrators to manage one or more corpuses or structured venue data and/or directed information for use within one or more applications and/or services. In one example, properties and applications of any of the venue data component 108, the popularity prediction component 110, the user interface component 112, and storages 114, can be managed using the administrative component 116. In examples, processing by any of the components of system 100 may be managed via an administrative index, file, webpage etc., which can show any metrics related to venue data and processing of venue data, among other examples. The administrative component 116 may further manage processing operations (modules, APIs, templates, algorithms, etc.) that are used to perform operations in any of the components of system 100. In managing data, the administrative component 116 may interface with storages 114.

In examples, the administrative component 116 may comprise a graphical user interface (GUI) that enables administrators to access venue data and generated directed information such as ranked lists of venues. An example of ranked venue list is described in the description related to FIG. 2. In examples, the administrative component 116 may include functionality including but not limited to: enabling lookup of venue data and/or associated data using an identifier or via autocomplete functionality, view and set metadata related to the application/service, view statistical and metric data related to any aspect of venue data and/or directed information, manage processing operations related to the application/service including collection and evaluation of venue data viewing metrics related to how venue data and/or directed information is being perceived in application use, user feedback management for venue data, curation statistics and analysis, extraction statistics and analysis, tagging statistics and analysis, and retained data and/or unused data that may be useful in making future determinations for predicting trends in venue data, among other examples.

FIG. 2 illustrates an exemplary processing device view 200 of a compiled ranked list of venue data as described herein. The ranked list shown in processing device view 200 is an example of directed information that may be generated based on processing of venue data as described in system 100 of FIG. 1. Processing device view 200 is an example of a generated ranked list illustrating predicted popularity scores each of a plurality of trending venues for a geographic region (e.g., New York City). The ranked list may be displayed on a processing device operating an exemplary application/service as described herein. As an example, the generated ranked list shown in processing device view 200 is a predictive list of venues that are estimated to be the most popular/trendy for an upcoming time period (e.g., one day, week, month, year, etc.). For instance, the ranked list is titled "Hot This Week" highlighting venues that the application/service predicts may be most popular in the upcoming week. As described in the description of FIG. 1, ranked lists may be customizable based on any number of factors including user preference (or user predicted preference), location, time period, type of venues, and new/existing venues or a combination thereof, among other examples. In other examples, an exemplary application/service may be configured to output a ranked generated list that provides summation of current or past popularity/trendiness related to evaluated venue data.

As shown in processing device view 200, a number of ranked venues may be displayed for a predetermined time period of one week. The number of venues displayed in a ranked list may vary depending on a predetermined program conditions (e.g., output the top N number of ranked venues). In another example, the number of venues displayed in the ranked list may vary based on a threshold determination of a predicted popularity rank/score (shown as "Hotness Score" in FIG. 2 and described in processing operations of system 100 as ranking_signal), where a number of venues above the threshold determination may be displayed. Calculation of a predicted popularity rank/score is described above in the description of system 100. In some examples, display of trending venues in a ranked list highlight new venues in a geographic region. As previously described, new venues may have venue data that exists for a period of time less than or equal to a predetermined time threshold value. For instance, a new venue of "Hot Cross Buns" is displayed as a trending new venue. In such an example, "Hot Cross Buns" might be the newest pastry venue in a geographic region of New York City when another pastry shop of "JagaBuns" may be more historically known and predicted to be more popular in the geographic region. In an alternative example, new venues may be determined from a threshold determination that is based on an amount of venue data (e.g., a small number of venue data may provide indication that a venue may be newer rather than older). A ranked generated list may be interactive. For example, the application may provide the ability to select or navigate through user interface elements associated with a ranked list to access data for venues, information on ranking/scoring, change geographic locations, change time periods for viewing other generated lists or trigger generation of a new ranked list, as well as use the list to interact in with other portions of the application/service such as user profiles (like/dislike, postings, tips/recommendations, check-ins,) and/or directed information. In further examples, selecting an entry from the ranked list may provide additional information about a selected venue. The additional information may include details about the venue (e.g., location, hours of operation, or other types of descriptive data) or may interact with other applications to provide additional functionality. For example, selection of an entry may automatically activate a map application on a device, such as a client processing device, to provide directions to the selected venue from the current location of the device.

FIG. 3A illustrates an exemplary method 300 for providing data for predicted popularity of venues as described herein. As an example, method 300 may be executed by an exemplary system such as system 100 or on a processing device such as processing device 400 described in FIG. 4 by one or more of the venue management components 106. In examples, method 300 may be executed on a device comprising at least one processor configured to store and execute operations, programs or instructions. However, method 300 is not limited to such examples. In other examples, method 300 may be performed by an application/service executing a search and discovery application/service. As an example, method 300 may be executed in association with a mobile application executing upon a client device and/or connected with one or more additional processing devices over a distributed network.

Method 300 begins at operation 302 where one or more venues are determined. In one example, operation 302 may comprise determining one or more new venues. As previously described, a new venue may be a venue that has venue data existing for a period of time less than or equal to a predetermined time threshold value. For instance, a new venue may be an identified venue having venue data that is less than one month old. In other instances, new venues may be venues having a certain amount of venue data that is less than or equal to a venue data threshold determination. For instance, a venue having a small amount of venue data may be a venue that has not yet been featured in generation of directed information but may be worth highlighting by an exemplary application/service. In alternative examples, operation 302 may comprise determining one or more existing venues. Operation 302 may comprise processing operations for accessing venue data, scanning the venue data and identifying potential candidate venues that may be included in directed information such as a generated ranked list of venues. As an example, operation 302 may comprise one or more processing operations performed by a processing device and/or the venue data component 108 described in the description of FIG. 1.

Flow proceeds to operation 304 where venue data is evaluated for the determined one or more venues. Operation 304 may comprise one or more processing operations performed by a processing device and/or venue management components such as the venue data component 108 and venue popularity prediction component 110 described in the description of FIG. 1. As an example, operation 304 may comprise evaluating venue data associated with the one or more new venues. Operation 304 may comprise processing operations for analyzing and curating venue data. As identified above, venue data is collected data that is selected from at least one of: passive signal data corresponding with a venue and active signal data corresponding with the venue. Examples of passive signal data may comprise collected signal data selected from a group consisting of: collected wireless scan data, geocoding information, application information, and device information. Examples of active signal data may comprise collected signal data that is selected from a group consisting of: venue check-in data, venue visit data, tips including the one or more new venues, recommendations including the one or more new venues, reviews of the one or more new venues, saved data corresponding with the one or more new venues, and likes/dislikes for the one or more new venues.

Flow may proceed to operation 306 where a predicted popularity is generated for the one or more venues. Operation 306 may comprise one or more processing operations performed by a processing device and/or venue management components such as the venue popularity prediction component 110 described in the description of FIG. 1. Examples of predicted popularity have been described in detail in the descriptions of FIGS. 1 and 2 above. Operation 306 may generate a predicted popularity score for the one or more venues based on processing operations that evaluate the venue data for the one or more venues. Operation 306 may comprise applying processing operations to evaluate a total recent popularity for the one or more new venues using the venue data. Operation 306 may further comprise applying processing operations to evaluate a change in recent popularity for the one or more new venues using the venue data. Generation (operation 306) of a predicted popularity score for the one or more new venues may occur based on applied processing operations that evaluate the total recent popularity and the change in recent popularity using a weighted model. In one example, machine-learning processing operations are applied for evaluation the total recent popularity and the change in recent popularity of the one or more new venues, for example in a linear analysis. As an example, a predicted popularity score may be generated for a specified future time period. However, examples described herein are not limited to such examples.

In some examples of method 300, flow may proceed to operation 308 where a ranked list of venues is generated based on evaluation of the predicted popularity score for the one or more determined venues. An example of a ranked list is provided in FIG. 2. However, it should be recognized that generation of directed information may vary from what is shown and described with respect to FIG. 2. Operation 308 may comprise one or more processing operations performed by a processing device and/or venue management components such as the venue popularity prediction component 110 described in the description of FIG. 1. In examples, a ranked list may not include all scored venues, as generation (operation 308) of the ranked list may filter out some of the scored venues based on processing operations applied. For example, the scored venues may be filtered based on ranking scores, geographic location of the venues, type of the venues, or any other filtering category.

Flow may proceed to operation 310, where the generated predicted popularity for the one or more venues is provided. In examples, operation 310 may comprise providing the generated popularity score in directed information that corresponds with an exemplary application/service. Operation 310 may comprise displaying a generated ranked list on a processing device (e.g., executing an exemplary application/service) and present the one or more venues (e.g., new venues) in a ranked order according to the generated predicted popularity scores. In another example, a generated predicted popularity score for a single venue/new venue may be presented to a user in a recommendation, tip, suggestion, etc. In some examples, the ranked list may be generated (operation 308) on a first processing device (e.g., server) and transmitted for display on another processing device (e.g., client device such as a mobile phone or computer).

In some examples, flow may proceed to operation 312 where the generated ranked list may be updated. Updates may be provided through an exemplary application/service. Operation 312 may comprise updating a generated ranked list, and providing the updated ranked list to a processing device. In other examples, operation 312 may comprise further processing of generated directed information, for example from an administrative standpoint as described with respect to the administrative component 116 detailed in the description of FIG. 1. In alternative examples where other types of directed information are generated, operation 312 may apply to updating such directed information.

Figure 3B:
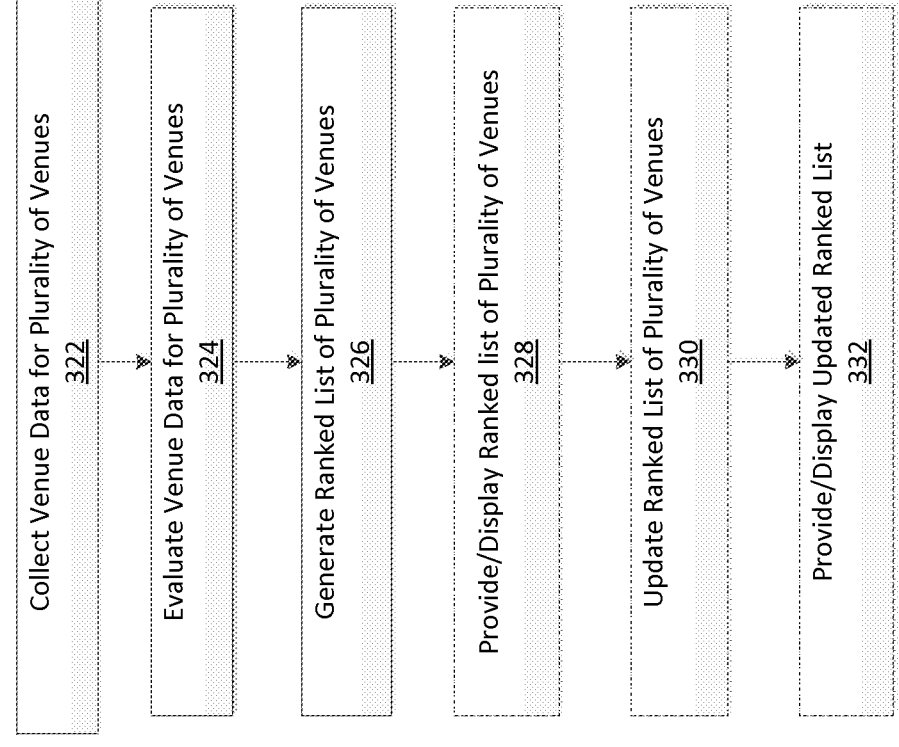
FIG. 3B illustrates an exemplary method for generating and providing a ranked list of venues as described herein.

FIG. 3B illustrates an exemplary method 320 for generating and providing a ranked list of venues as described herein. As an example, method 320 may be executed by an exemplary system such as system 100 or on a processing device such as processing device 400 described in FIG. 4 by one or more of the venue management components 106. In examples, method 320 may be executed on a device comprising at least one processor configured to store and execute operations, programs or instructions. However, method 320 is not limited to such examples. In other examples, method 320 may be performed an application/service executing a search and discovery application/service. As an example, method 320 may be executed in association with a mobile application executing upon a client device and/or connected with one or more additional processing devices over a distributed network.

Method 320 begins at operation 322 where venue data is collected for a plurality of venues. In an example, venue data may be collected (operation 322) for a plurality of new venues. Flow may proceed to operation 324 where the collected venue data is evaluated. In examples, evaluating may further comprise applying processing operations to determine a total recent popularity for a venue of the plurality of new venues using the venue data and applying processing operations to determine a change in recent popularity for the one or more new venues a venue of the plurality of new venues using the venue data. Examples of such processing operations are described above with respect to the description of FIGS. 1 to 3A.

Flow may proceed to operation 326 where a ranked list is generated for the plurality of venues. Operation 326 may comprise generating the ranked list based on a predicted popularity determination/score for each of the plurality of new venues. As an example, operation 326 may comprise ranking the plurality of new venues according to the predicted popularity determination. As an example, the predicted popularity may be for each venues based on applied processing operations that evaluate the total recent popularity and the change in recent popularity for each of the plurality of new venues. In doing, so a weighted model may be used that assigns weights to different features (described above) that may be used to generate a predicted popularity determination for a venue. A ranked list may not include all scored venues, as generation (operation 326) of the ranked list may filter out some of the scored venues based on processing operations applied.

Flow may proceed to operation 328 where a ranked list is provided/displayed. Operation 328 may comprise displaying the ranked list on a system/processing device or providing the ranked list to one or more other processing devices. The ranked list may be provided via an exemplary application, via email, or via any other type of electronic communication. In some examples, flow may proceed to operation 330 where the ranked list may be updated. Updates may be provided to a user through an exemplary application/service. Operation 330 may comprise updating a generated ranked list. Method 320 may further comprise providing (operation 332) the updated ranked list for display on a processing device (e.g., client device executing an exemplary application/service or server device, among other examples) or transmitting the updated ranked list to another processing device (e.g., client device executing an exemplary application/service or server device, among other examples).

Figure 4:
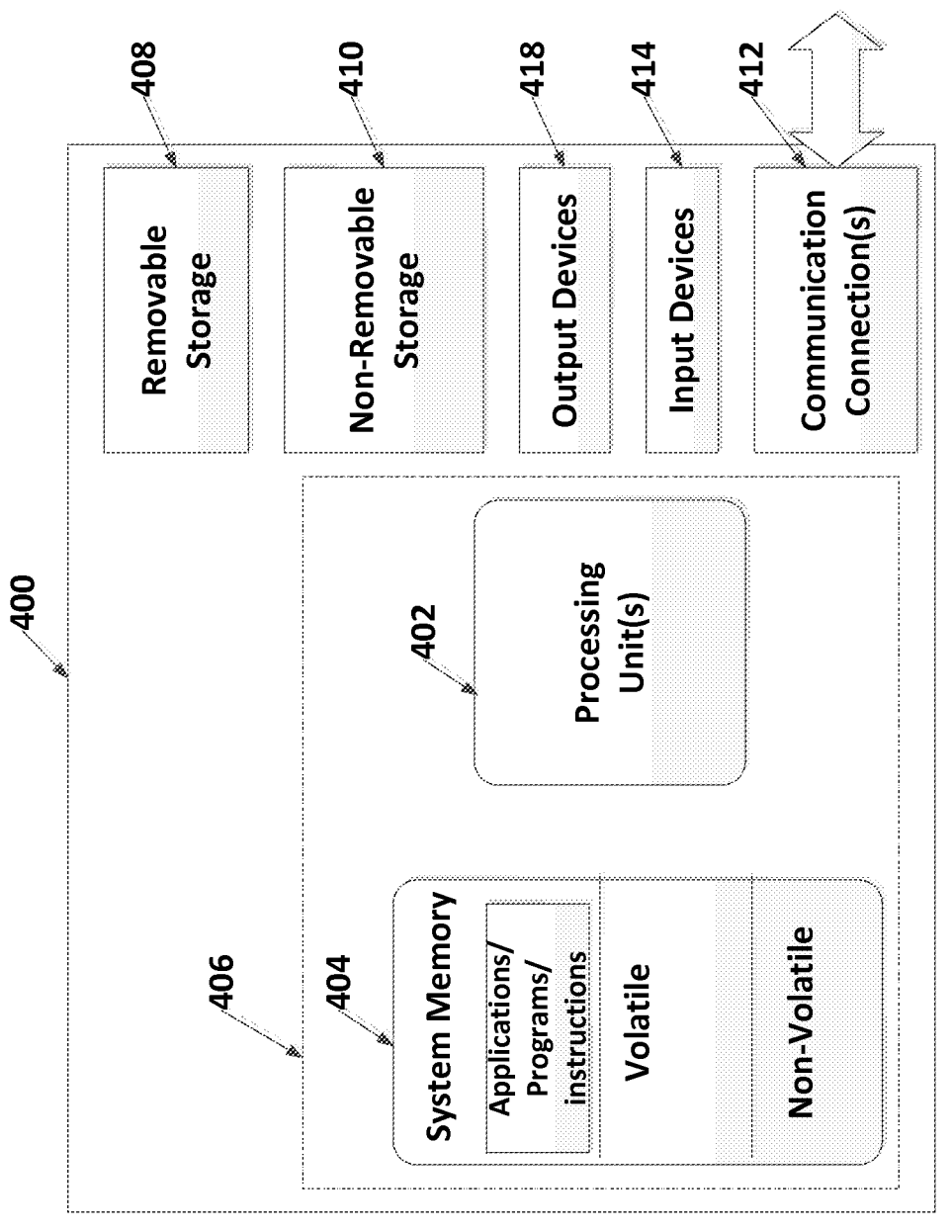
FIG. 4 illustrates one example of a suitable operating environment 400 in which one or more of the present examples may be implemented.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, venue-based applications module(s), e.g., venue check-in applications, venue search applications, geocoding/reverse geocoding applications, APIs, programs etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device (s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Although not required, the embodiments described herein may be implemented as computer-executable instructions, such as by program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

As stated above, a number of program modules and data files may be stored in the system memory 404. While executing on the processing unit 402, program modules 408 (e.g., applications, Input/Output (I/O) management, and other utilities) may perform processes including, but not limited to, one or more of the stages of the operational methods described herein such as methods 300 and 320 illustrated in FIGS. 3A and 3B, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A computer-implemented method comprising:

determining one or more new venues, wherein the determination is based upon identifying venue data existing for a period of time less than or equal to a predetermined time threshold value, wherein the venue data comprises active signal data and passive signal data received from a plurality of client devices, the passive signal data comprising wireless scan data collected by one or more client devices;

for the one or more new venues:

generating a total recent popularity using the venue data, wherein the total recent popularity is associated with a recent period of time that is less than or equal to the predetermined time threshold value, wherein the recent popularity is based at least in part upon a decayed sum of an aggregate count for one or more of a check-in to a venue, passive data indicating a visit to a venue, and saving information about a venue to a list;

generating a change in recent popularity using the venue data, wherein the change in recent popularity is associated with the recent period of time, wherein the change in recent popularity is based upon a linear trend line derived based upon a recent time series of the aggregate count for one or more of a second check-in to a venue, second passive data indicating a visit to a venue, and second saving information about a venue to a list; and generating, using a machine-learning process, a predicted popularity value based on the total recent popularity and the change in recent popularity;

determining, based on predicted popularity values for the one or more new venues, a normalized predicted popularity value for each venue, wherein the normalized predicted popularity value is determined based at least upon a transformation of one or more features used to generate the predicted popularity value, wherein the transformation normalizes each feature value of the one or more features against comparable feature values of comparable venues having a similar category to the one or more new venues to approximate a standard distribution, the comparable venues being located in the geographic region of the one or more new venues;

determining, using a machine learning model, one or more scores for the one or more new venues based at least on the normalized predicted popularity values and user preferences, wherein the machine learning model generates the one or more scores by weighting collected venue data based upon a type associated with the collected venue data;

ranking the one or more new venues based at least on the one or more scores to generate a customized ranked list of venues; and providing, to a processing device, at least a part of the customized ranked list of venues for display by the processing device, wherein the customized ranked list comprises summation data of current popularity for ranked venues included in the customized ranked list.

2. The computer-implemented method according to claim 1, wherein the venue data is collected data that is further selected from active signal data corresponding with the venue and received from the plurality of client devices.

3. The computer-implemented method according to claim 2, wherein the passive signal data is collected signal data selected from a group consisting of: collected wireless scan data, geocoding information, application information, or device information; and wherein the active signal data is collected signal data that is selected from a group consisting of: venue check-in data, venue visit data, tips including the one or more new venues, recommendations including the one or more new venues, reviews of the one or more new venues, saved data corresponding with the one or more new venues, and likes/dislikes for the one or more new venues.

4. The computer-implemented method according to claim 1, wherein determining a normalized predicted popularity value further comprises:

evaluating the total recent popularity and the change in recent popularity using a weighted model.

5. The computer-implemented method according to claim 4, wherein machine-learning processing operations are applied for evaluating the total recent popularity and the change in recent popularity of the one or more new venues.

6. The computer-implemented method according to claim 1, wherein the customized ranked list comprises a display of the one or more new venues and normalized predicted popularity values.

7. The computer-implemented method according to claim 6, wherein the one or more new venues are located in a geographical region other than a geographical region associated with the processing device.

8. The computer-implemented method according to claim 1, further comprising updating the customized ranked list, and providing the updated customized ranked list to the processing device.

9. A system comprising:

at least one processor; and a memory operatively connected with the processor, wherein the memory comprises computer-executable instructions that, when executed by the at least one processor, cause the at least one processor to perform a method comprising:

evaluating a total recent popularity using the venue data, wherein the total recent popularity is associated with a recent period of time that is less than or equal to the predetermined time threshold value, wherein the recent popularity is based at least in part upon a decayed sum of an aggregate count for one or more of a check-in to a venue, passive data indicating a visit to a venue, and saving information about a venue to a list;

evaluating a change in recent popularity using the venue data, wherein the change in recent popularity is associated with the recent period of time, and wherein the change in recent popularity is based at least in part upon a linear trend line derived based upon a recent time series of the aggregate count for one or more of a check-in to a venue, passive data indicating a visit to a venue, and saving information about a venue to a list;

determining one or more new venues, wherein the determination is based upon identifying venue data existing for a period of time less than or equal to a predetermined time threshold value, wherein the venue data comprises active signal data and from passive signal data received from a plurality of client devices, the passive signal data comprising wireless scan data collected by one or more client devices;

evaluating the venue data associated with each venue of the one or more new venues to generate, using a machine-learning process, a predicted popularity value for each venue;

determining, based on predicted popularity values, a normalized predicted popularity value for each venue, wherein the normalized predicted popularity value is determined based at least upon a transformation of one or more features used to generate the predicted popularity value, wherein the transformation normalizes each feature value of the one or more features against comparable feature values of comparable venues having a similar category to the one or more new venues to approximate a standard distribution, the comparable venues being located the geographic region of the one or more new venues;

determining, using a machine learning model, one or more scores for the one or more new venues based at least on the normalized predicted popularity values and user preferences, wherein the machine learning model generates the one or more scores by weighting collected venue data based upon a type associated with the collected venue data;

ranking the one or more new venues based at least on the one or more scores to generate a customized ranked list of venues; and providing at least a part of the customized ranked list of venues for display by a processing device, wherein the customized ranked list comprises summation data of current popularity for ranked venues included in the customized ranked list.

10. The system according to claim 9, wherein the venue data is collected data that is further selected from active signal data corresponding with the venue and received from the plurality of client devices;

wherein the passive signal data is collected signal data selected from a group consisting of: collected wireless scan data, geocoding information, application information, or device information; and wherein the active signal data is collected signal data that is selected from a group consisting of: venue check-in data, venue visit data, tips including the one or more new venues, recommendations including the one or more new venues, reviews of the one or more new venues, saved data corresponding with the one or more new venues, or likes/dislikes for the one or more new venues.

11. The system according to claim 10, wherein generating the predicted popularity value further comprises:

generating the predicted popularity for the venue based on the total recent popularity and the change in recent popularity of the venue.

12. The system according to claim 11, wherein machine-learning processing operations are applied for evaluating the total recent popularity and the change in recent popularity of the one or more new venues.

13. The system according to claim 9, wherein the customized ranked list comprises a display of the one or more new venues and normalized predicted popularity values in a ranked order according to the generated normalized predicted popularity values.

14. The system according to claim 13, wherein the determined one or more new venues are located in a geographical region other than a geographical region associated with the processing device.

15. The system according to claim 9, wherein providing at least a part of the customized ranked list further comprises transmitting at least a part of the customized ranked list to another processing device.

16. The system according to claim 9, wherein the memory further comprises computer-executable instructions that, when executed by the at least one processor, perform operations comprising:

updating the customized ranked list; and providing the updated customized ranked list to one or more processing devices.

17. The system according to claim 9, wherein normalized predicted popularity values are determined using a weighted model.

18. A system comprising:

at least one processor; and a memory operatively connected with the processor, wherein the memory comprises computer-executable instructions that, when executed by the at least one processor, perform a method comprising:

collecting venue data for a plurality of new venues, wherein the plurality of new venues are determined based upon identifying venue data existing for a period of time less than or equal to a predetermined time threshold value, wherein the venue data comprises active signal data and from passive signal data received from a plurality of client devices, the passive signal data comprising wireless scan data collected by one or more client devices;

evaluating the venue data for the plurality of new venues, wherein the evaluating further comprises, for the plurality of new venues:

determining a total recent popularity using the venue data, wherein the recent popularity is based at least in part upon a decayed sum of an aggregate count for one or more of a check-in to a venue, passive data indicating a visit to a venue, and saving information about a venue to a list;

determining a change in recent popularity using the venue data, wherein the total recent popularity and the change in recent popularity are each associated with a recent period of time that is less than or equal to the predetermined time threshold value, wherein the change in recent popularity is based upon a linear trend line derived based upon a recent time series of the aggregate count for the one or more of a check-in to a venue, passive data indicating a visit to a venue, and saving information about a venue to a list;

generating, using a machine-learning process, a predicted popularity value based on the total recent popularity and the change in recent popularity; and determining, based on predicted popularity values for the one or more new venues, a normalized predicted popularity value for each venue, wherein the normalized predicted popularity value is determined based at least upon a transformation of one or more features used to generate the predicted popularity value, wherein the transformation normalizes the one or more features against one or more comparable features of comparable venues having a similar category to the one or more new venues in order to approximate a standard distribution, the comparable venues being located in the geographic region of the one or more new venues;

determining, using a machine learning model, one or more scores for the one or more new venues based at least on the normalized predicted popularity values and user preferences, wherein the machine learning model generates the one or more scores by weighting collected venue data based upon a type associated with the collected venue data;

generating a ranked list for the plurality of new venues based on the one or more scores;

generating a customized ranked list based upon user preferences; and providing at least a part of the customized ranked list to a processing device for display, wherein the customized ranked list comprises summation data of current popularity for ranked venues included in the customized ranked list.

19. The system according to claim 18, wherein the memory further comprises computer-executable instructions that, when executed by the at least one processor, perform operations comprising:

updating the customized ranked list; and transmitting the updated customized ranked list to one or more processing devices.

* * * * *